April 13, 1965 G. MACLEAN 3,178,179

DOCUMENT TRANSFERRING APPARATUS

Filed Jan. 29, 1963 8 Sheets-Sheet 1

INVENTOR.
GEORGE MACLEAN
BY
ATTORNEY

April 13, 1965 G. MACLEAN 3,178,179

DOCUMENT TRANSFERRING APPARATUS

Filed Jan. 29, 1963 8 Sheets-Sheet 2

INVENTOR
GEORGE MACLEAN
BY

[signature]
ATTORNEY

INVENTOR.
GEORGE MACLEAN
BY
[signature]
ATTORNEY

April 13, 1965 G. MACLEAN 3,178,179
DOCUMENT TRANSFERRING APPARATUS
Filed Jan. 29, 1963 8 Sheets-Sheet 4

INVENTOR.
GEORGE MACLEAN
BY
ATTORNEY

April 13, 1965 G. MACLEAN 3,178,179

DOCUMENT TRANSFERRING APPARATUS

Filed Jan. 29, 1963 8 Sheets-Sheet 5

INVENTOR.
GEORGE MACLEAN
BY

ATTORNEY

INVENTOR.
GEORGE MACLEAN
BY
Louis P. Elberger
ATTORNEY

April 13, 1965 G. MACLEAN 3,178,179

DOCUMENT TRANSFERRING APPARATUS

Filed Jan. 29, 1963 8 Sheets-Sheet 7

INVENTOR.
GEORGE MACLEAN

BY

ATTORNEY

INVENTOR.
GEORGE MACLEAN
BY
ATTORNEY 3,178,179

DOCUMENT TRANSFERRING APPARATUS

George Maclean, Phoenix, Ariz., assignor to General Electric Company, a corporation of New York Filed Jan. 29, 1963, Ser. No. 254,617
38 Claims. (Cl. 271—74)

This invention concerns an item handling apparatus and more particularly a device for accepting flexible documents and for transferring the documents to a stacking compartment.

In an item handling apparatus of the type described in U.S. Patent 3,108,694 "System for Collating Documents in Response to Indicia Appearing Thereon," issued October 29, 1963, by N. R. Crain et al., and assigned to the present assignee, documents such as sheets of paper containing information symbols printed on the paper, are fed one-by-one by a feeding device at regular time intervals from a feed magazine or document supply stack to a symbol reading device. The symbol reading device may be of the type described in U.S. Patent 3,000,000 "Automatic Reading System, by K. R. Eldredge assigned to the present assignee, or any other suitable reading device adapted for reading automatically information symbols of the type which are recorded on the document. After reading of the symbols, the document is carried by a transporting mechanism past a series of individual stacking or transferring devices. Each transferring device, in response to signals generated by the symbol reading device or external control signals, transfers the document from the transporting mechanism into a respective stacking or receiving compartment.

The transferring of individual documents into a particular stacking compartment must take place with no time delay in the orderly sequence of operations. In addition, transferring of the documents into a stacking compartment must take place in such a manner that mutilation or jamming of the documents will have minimum chance to occur.

If mutilation or jamming of a document should occur at a point where the document is being transferred from the transporting mechanism, the document usually ceases to travel and consequently any succeeding document being transported toward the stopped document will in turn jam against that document and possibly also be mutilated.

In the past, mechanical gates or guides have been used to direct a traveling document into a stacking compartment. Stacking devices utilizing various systems of air jets, springs, vacuum belts and document momentum have been used to deposit the document completely in the stacking compartment after the document has been directed or deflected by the mechanical gates. While the mentioned directing and stacking devices function with varying degrees of success they present problems of maintenance and sequence timing, and adversely affect the overall cost and efficiency of the complete document handling apparatus.

In order to eliminate as much as possible the various mechanical guiding or directing devices recited above, there has been developed the cylindrically shaped rotating document stacker shown in U.S. Patent, 2,867,438 "Paper Stacking Device," by Tatsu Hori and assigned to the present assignee. The present invention is of a type similar to the device shown in the Tatsu Hori patent. In the rotating document stacker, a document, moving past or adjacent a cylindrically surfaced rotating drum, is drawn against the surface of the drum by a partial vacuum communicated to a plurality of sets of openings provided in the surface of the drum. The vacuum provides enough force to urge the document to move with the rotating drum until the vacuum is removed from the sets of openings.

The principle of a rotating vacuum-applying drum is advantageous in that there are no mechanical devices placed in the path of the moving document; thus jamming and consequent mutilation of moving documents is minimized.

In one form of rotating drum stacking device each set of openings communicates by means of a relatively narrow passageway with a vacuum source. Communication between the vacuum source and set of openings is controlled by a small movable valve positioned within the passageway. However, inefficient air flow may be encountered when a vacuum is communicated to a plurality of openings by means of a relatively small communicating passageway and the communication is controlled by a valve which further restricts the effective size of the passageway. In order to provide sufficient vacuum, i.e., negative pressure, a relatively large magnitude of negative pressure must be provided by the vacuum source. Provision of a vacuum source sufficient to enable proper functioning of the apparatus requires heavy, bulky vacuum pumps, and expensive seals thereby adding to the initial cost of the overall system and in addition adding to the cost and noise of operation of the system.

When using a rotating drum incorporating narrow vacuum passageways to transfer documents having somewhat ragged edges (perforated documents and documents that have been handled considerably), lint from the ragged edges becomes easily lodged in the narrow passageways and valve constriction. When this condition occurs the efficient communication of a vacuum with the set of openings is additionally reduced.

With the arrangement of valves and valve closing mechanism of the last mentioned patent, when a document being held against the surface of the rotating drum approaches the stacking compartment, not all of the valves allowing vacuum communication to the plurality of sets of holes on the surface of the drum can be closed simultaneously. It is necessary to first close one valve then the remaining valves in succession until there is complete removal of vacuum from the plurality of sets of holes. This arrangement has been found at times to buckle or crumple a document, since at the time the forward area of a document is released from the force of a vacuum, the rearward area of the document is still firmly urged against the rapidly moving drum.

The valve actuating mechanism of the last mentioned patent provides a pivoted arm for actuating the valve as the drum rotates, when it is desired to establish communication between the vacuum source and set of openings. The frequent impacts of the pivot arm action may at times warp the small valves thereby causing the valves to stick in their housings.

Accordingly, it is the principal object of the present invention to provide an improved apparatus for removing or transferring a document from a path of travel and depositing the document into a stacking compartment.

Another object of this invention is to provide a device which more efficiently utilizes the power of a vacuum to remove a document from a transporting path.

Another object of this invention is to provide an improved document transferring apparatus that does not mutilate or damage documents being transferred.

Another object of this invention is to provide a document transferring device that requires a minimum of maintenance.

Another object of this invention is to provide a document transferring device that is less subject to breakdown than prior art devices.

Further objects and advantages of the present invention will become apparent from the ensuing description.

One embodiment of the present invention to effect the recited objects is achieved in a single stacking device by providing, adjacent to a document transporting path, a hollow rotating cylindrically surfaced drum containing sets of ports or openings in its cylindrical surface. A negative air pressure is maintained inside the hollow rotating drum. A large valve is carried within the drum to control communication of the negative air pressure to each opening of a set of openings. A cam follower attached to the valve cooperates with a stationary cam to open and close the large valve. A latch is provided to prevent the cam follower from following the stationary cam when the transferring device is not to transfer documents from the transporting path. An electrically operated solenoid is provided to disable the latch and allow the cam follower to follow the stationary cam when the transferring device is to transfer documents passing adjacent the rotating drum.

The features of novelty that are considered characteristic of this invention are set forth with particularity in the appended claims. The organization and method of operation of the invention itself will best be understood from the following description when read in connection with the accompanying drawings in which:

The embodiments of the invention are shown in the figures and described herein as operating in a horizontal position; i.e., with the axis of rotation of the drum vertical. However, it is to be understood that the invention will operate equally well in a vertical, or a tilted position.

DOCUMENT HANDLING APPARATUS

Figure 1:
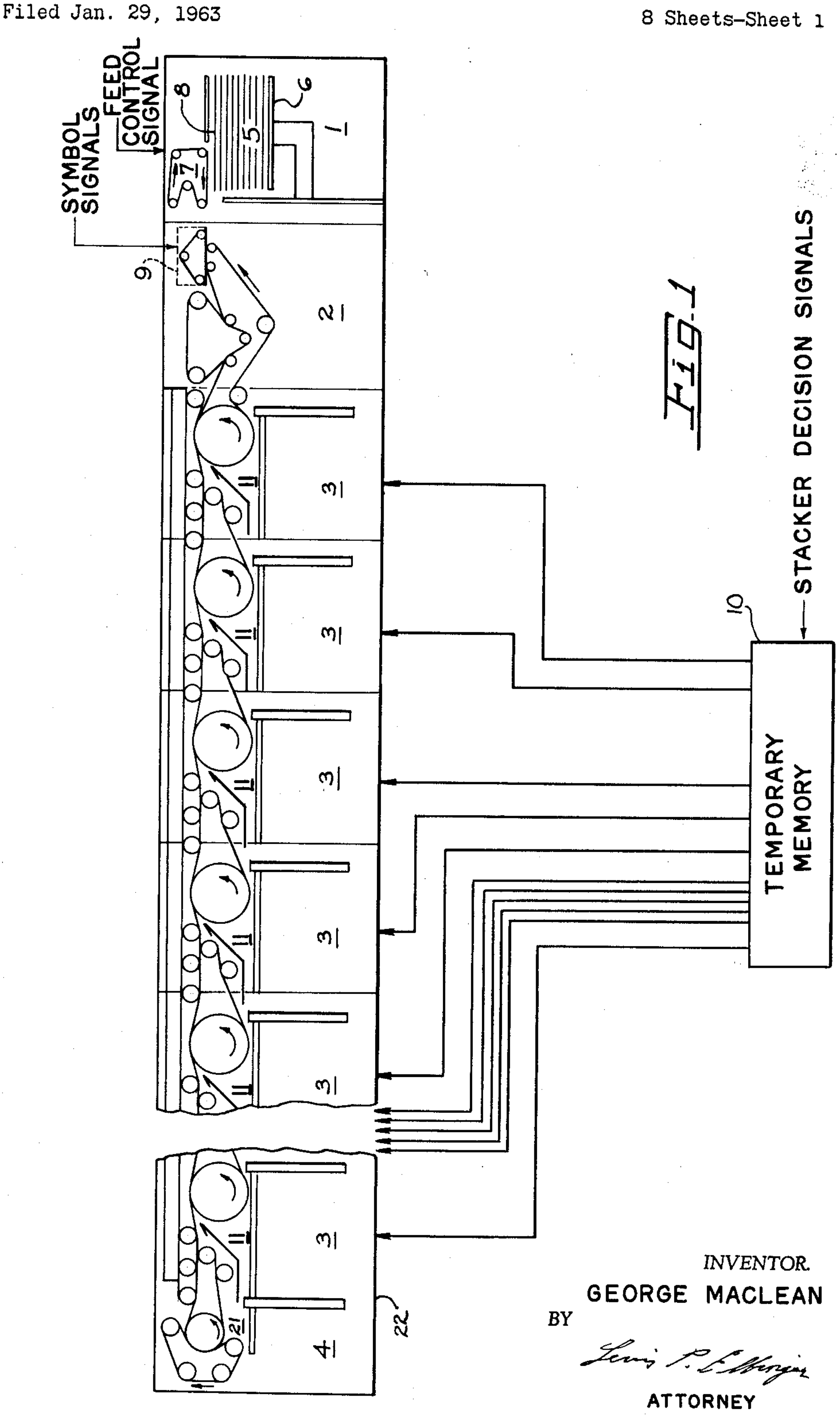
FIGURE 1 is a diagrammatic top elevational view showing apparatus utilizing the present invention.

FIG. 1 illustrates a document handling or sorting apparatus utilizing the present invention. The apparatus is sectionalized into several distinct functional sections, namely from right to left in the figure, a document feeding section indicated generally at 1, a document reading section indicated at 2, a series of identical document transferring or sorting sections each indicated at 3, and at the extreme left a reject document receiving section indicated at 4.

The function of the document feeding section 1 is to supply documents such as checks one-by-one in succession at regular time intervals to the reading section 2. A stack of documents 5 is held upright by a pusher plate 6 which also serves to urge the stack of documents 5 against a document feeding device generally indicated at 7.

Information is carried on each document. For example, a document may contain symbols imprinted in magnetic ink or the information may consist of a particular combination of light and dark spots. Upon receipt of a feed Control Signal from an external source (not shown) the feeding device 7 accelerates the forward or leading document 8 in the stack 5 with a system of moving belts toward the document reading section 2.

Figure 2:
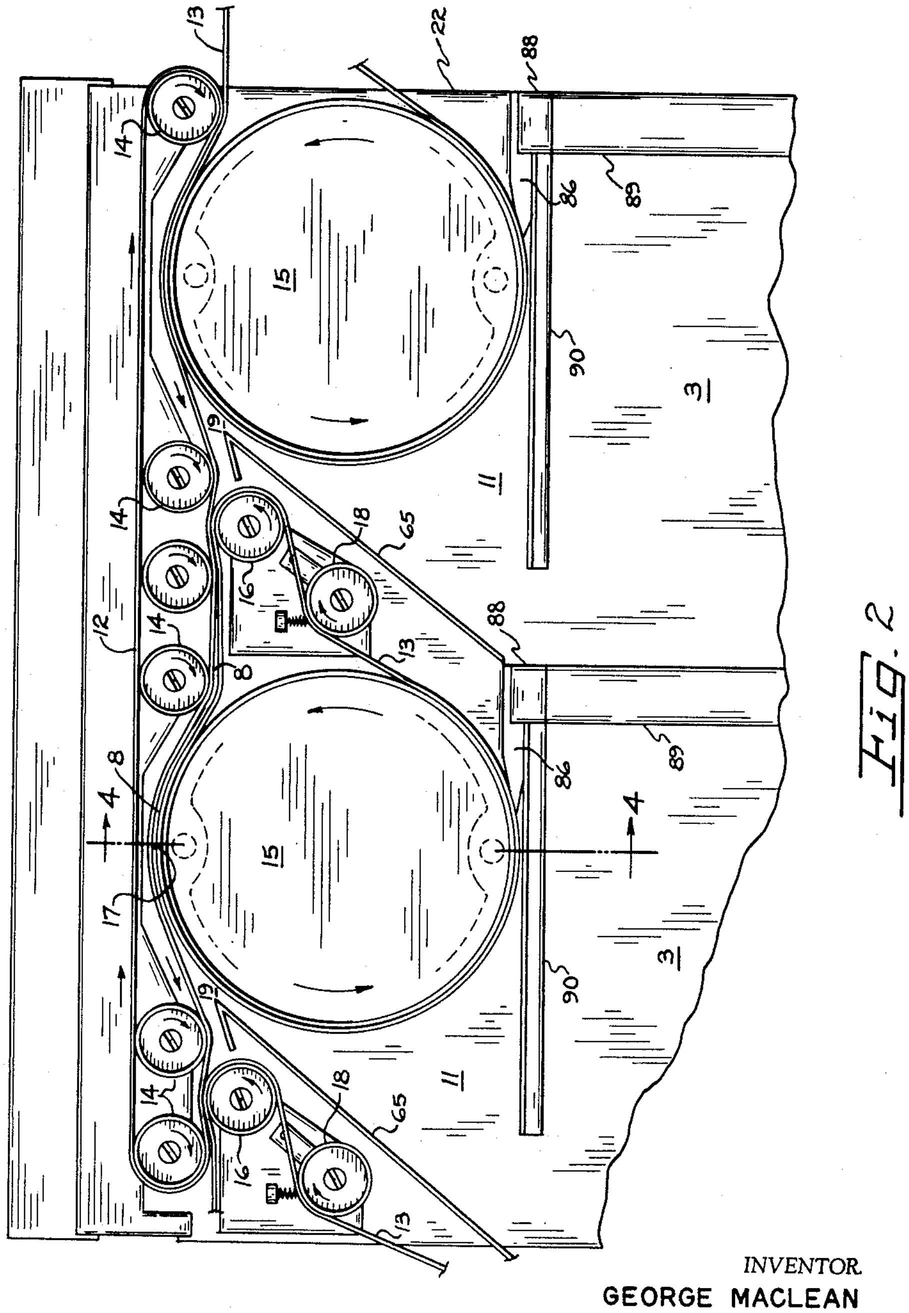
FIGURE 2 is an enlarged top elevational view showing, in detail, a portion of the apparatus of FIG. 1.

The document reading section 2 transports the document 8 past a symbol reading device 9 by a system of moving belts, where the information contained on the document 8 is read or sensed and converted to a corresponding series of electrical signals. The electrical signals are transmitted to an external device (not shown) such as an electronic data processor or a system shown in the previously mentioned patent application. The external device interprets the received signals and in turn transmits a Stacker Decision Signal to a temporary memory 10. The Decision Signal denotes the one of a plurality of stacking or depositing compartments 11 (FIGS. 1, 2, and 3) into which the document 8 just read must be deposited. The temporary memory 10 stores the Decision Signal until such time as it is to be utilized by the present invention.

After being read, the document 8 is directed toward the first of the series of document transferring sections 3. The document 8 is gripped and transported by a series of endless belts 12 and 13, shown in FIGS. 2 and 3. Belt 12 is held in operating position by a series of rollers 14. Belt 13 is held in position by a cylindrically surfaced drum 15, an idler roller 16 and a tension roller 18. Drum 15, which is a part of the present invention, is rotated in a counterclockwise direction by a driving system (not shown). The arrangement of rollers 14, 16, and 18 and drum 15 holds the belts 12 and 13 firmly against each other. Rotating drum 15 drives belt 13. Opposite each drum 15 is a document directing or transferring region 19 where a belt 13 is not adjacent a belt 12; instead belt 13 passes around drum 15 in a shallow groove 20 (FIG. 4) provided in the surface of the drum 15.

The document 8 (FIG. 2), being gripped between the plurality of moving belts 12 and 13, is transported from right to left at a constant speed such that the leading or forward edge 17 of the document 8 arrives at each directing region 19 at respective predetermined times after being fed by the document feeding device 7. If, at the time the leading edge 17 of a document 8 arrives at a directing area 19, the temporary memory 10 stores a Decision Signal denoting that this document 8 is to be transferred from the transporting path to the associated stacking compartment 11, an electrically operated solenoid, which is part of the present invention, is energized by the stored Decision Signal from the temporary memory 10. The document 8 is then transferred to the associated stacking compartment 11 by operation of the present invention.

If the document 8 is not to be transferred to the associated stacking compartment 11 as it enters an area 19 the document merely passes on to the next document stacking section 3. Thus it has been shown that a document 8 fed by the feeding device 7 is transported through one or more of a series of document transferring section 3 until its arrives at the particular section 3 for which memory 10 holds a Decision Signal, whereupon the document 8 is transferred to the corresponding compartment 11.

If any document 8 is not transferred ot a stacking compartment 11 it will automatically be deposited in a special compartment 21 which is part of the reject document receiving section 4.

DOCUMENT TRANSFERRING APPARATUS

Organization and operation of the document transferring apparatus of the present invention will now be described with particular reference to FIG. 4.

Figure 3:
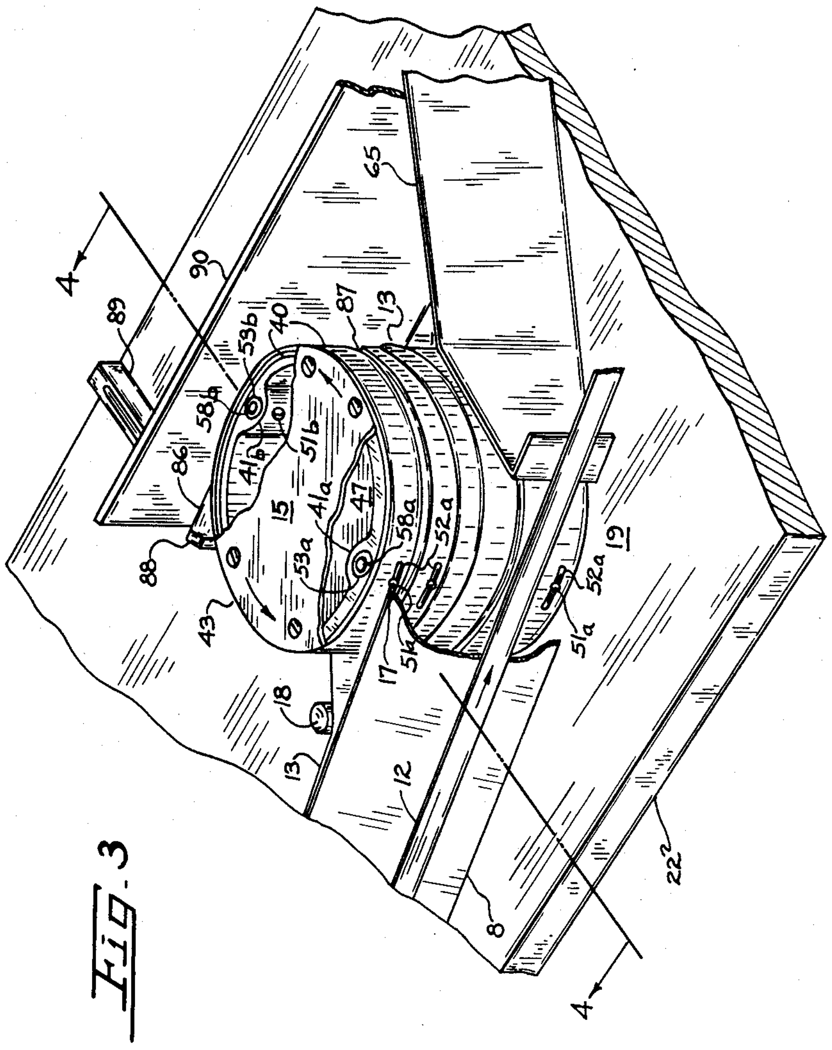
FIGURE 3 is a rear perspective view of one embodiment of the present invention.
Figure 4:
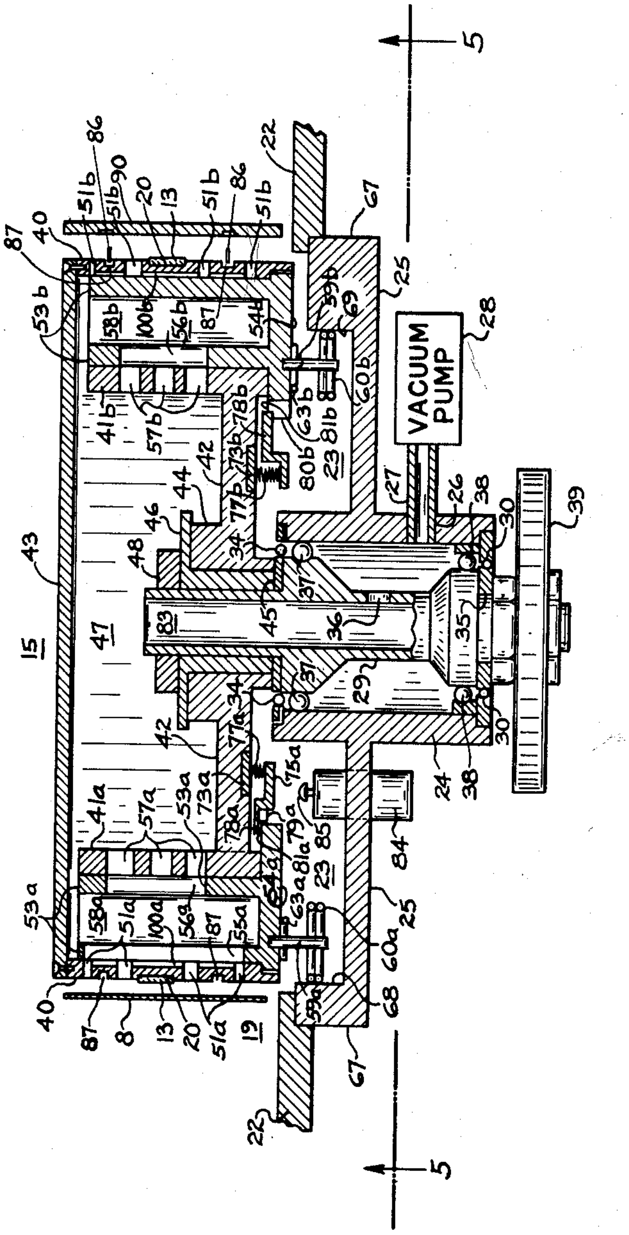
FIGURE 4 is a sectional view along the lines 4—4 of FIGS. 2 and 3.
Figure 6:
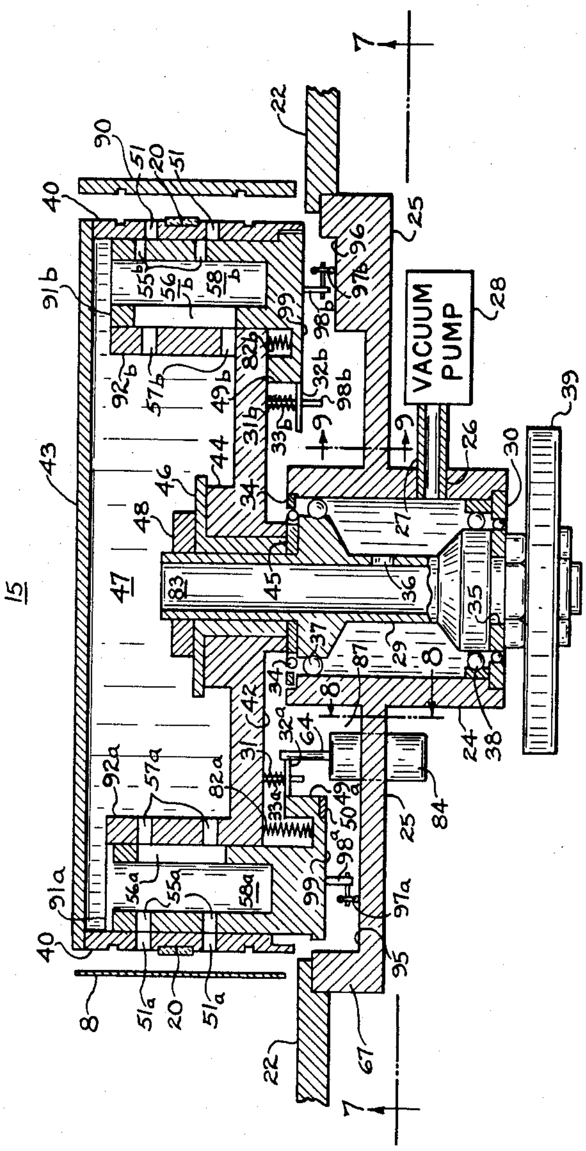
FIGURE 6 is a sectional view of a second embodiment of this invention.

The invention comprises a rotating, cylindrically surfaced drum 15 shown in FIGS. 3, 4, and 6.

Drum 15 is supported for rotation about its axis. A stationary base 22 (FIG. 4) is provided with a circular cutout 23. A circular rim 67 is securely attached to the cutout 23. A series of support arms 25 are secured to the rim 67 for holding a drive shaft housing assembly 24 centered in the cutout 23. The housing assembly 24 is basically a hollow tube provided with an orifice 26 to which is connected a conduit 27. A source of negative air pressure or vacuum such as a vacuum pump 28 is connected to the opposite end of the conduit 27.

A drive shaft 29 is supported in a vertical position in the center of the housing assembly 24 by means of ball bearings 30 and 34 which are retained in the housing assembly 24. The lower extremity of the shaft 29 extends downward through the bearings 30 and has affixed to the end thereof a timing wheel connector 35. The upper extremity of the drive shaft 29 extends upward through the bearings 34. The shaft 29 is hollow from below its middle portion to its extreme top portion to form a hollow portion 83 which is open at the top of the shaft 29. An opening 36 is provided at the lower end of hollow portion 83 to provide communication for vacuum between the hollow interior of the housing assembly 24 and the hollow portion 83 of shaft 29. O-ring seals 37 and 38 disposed between shaft 29 and housing assembly 24 minimize air leakage between the interior of the housing assembly 24 and atmosphere.

The timing wheel connector 35 has attached to it a tooth timing wheel 39. A timing belt (not shown) is connected between the wheel 39 and a prime mover, such as an electric motor (not shown), to rotate shaft 29 a a constant angular speed.

Drum 15 comprises a substantially hollow cylindrically surfaced wall 40 with two internally disposed hollow protrusions or valve assembly housings **41*a* and 41*b* which are illustrated as continuous extensions of wall 40. The valve assembly housings 41*a* and 41*b* need not be extensions of wall 40; they may be separate housings suitably held adjacent wall 40. A bottom closure 42 extends from the wall 40 and housings 41*a* and 41*b*. The top of wall 40 is sealed by a sealing plate 43. A substantially hollow interior 47 of drum 15 is thus defined by wall 40, closure 42 and plate 43**.

The drum 15 is mounted for rotation about its central axis. A mounting hub 44 is provided in the center of the closure 42, and an air seal 46 is positioned in the interior of the hub 44. Mounting hub 44 and seal 46 are clamped to the upper extension of the drive shaft 29 and to the face of an inner raceway 45 of bearing 34 through the use of a retaining means 48 whereby rotation of shaft 29 causes rotation of the drum 15.

The wall 40 is provided with two series or columns of openings or holes **51*a* and 51*b*. Each such series provides communication for vacuum between the exterior surface of the wall 40 and a common slot 100*a* and 100*b* on the interior surface of the wall 40. The slots 100*a* and 100*b* improve the efficiency of operation of the invention. Each slot 100*a* and 100*b* communicates with the hollow interior of a respective valve assembly housing 41*a* or 41*b***.

Grooves 52 are provided in the exterior of the cylindrically surfaced wall 40 (FIG. 3) to extend the effective area of the openings **51*a* and 51*b*** from a short distance in front of and to the rear of each opening. The grooves are provided to compensate for slight inaccuracies in system timing as more fully described below.

Although two separate series of holes **51*a* and 51*b*** are shown the document transferring apparatus of the instant invention is not so restricted. It is possible to use more than two series of holes or only one series of holes as desired.

VACUUM CONTROL VALVE ASSEMBLY

The present invention relates to the structural and operative relationship of a series of holes 51 with a valve and valve operating device for a document transferring device. The following portion of the description is generally concerned with description of structure and operation of only one valve and associated devices.

Whenever a moving document 8 is adjacent a series of openings 51, initiation of communication of a vacuum with the series of openings 51 will cause the document to be urged toward and held against the exterior of the wall 40. In addition, termination of communication for the vacuum with the openings 51 will result in depositing of the document 8 that was previously held against the wall 40.

This controlled communication between a series of openings 51 and the hollow interior 47 of the drum 15 is provided in an efficient manner.

Tubular shaped valves **53*a* and 53*b* are positioned and rotatably supported within respective valve assembly housings 41*a* and 41*b*. Each valve 53*a* and 53*b* contains a hollow interior or common distributing chamber 58*a* and 58*b* respectively. Each chamber 58 is open at the topmost point of the valve 53 and communicates with interior 47. The chamber 58 may however, be sealed from communication with the interior 47 of the drum 15** by any suitable closure such as a cap or plug.

Actuating plates **54*a* and 54*b*, contained on the bottom of valves 53*a* and 53*b* respectively, are each a continuation of the valve and serve to close off or seal the lower end of the respective valve 53**.

Each valve **53*a* and 53*b* is provided with a single elongated opening 55. Opening 55 registers with common slot 100 and communicates with slot 100 and chamber 58 as shown at the left in FIG. 4. A series of openings or holes providing communication between chamber 58 and the slot 100 may be used instead of the single elongated opening 55**.

In addition, each valve **53*a* and 53*b* is provided with a wide elongated slot 56*a* and 56*b* respectively. A slot 56 is located generally opposite an opening 55. A series of wide openings or holes may be provided in the valve 53 instead of the slot 56**.

Each valve assembly housing **41*a* and 41*b* is provided with a series of openings 57*a* and 57*b* respectively. A series of openings 57 provides communication between the slot 56 and the interior 47 of drum 15. A single elongated slot may be employed instead of a series of openings 57**.

Thus there is shown at the left in FIG. 4 apparatus for providing efficient vacuum communication between the exterior of the drum 15 and the interior 47 of the drum itself. This communication is by two paths; one path is from the series of openings **51*a*, through the slot 100*a*, through the opening 55*a*, through the chamber 58*a*, over the top of the valve 53*a*, and into the hollow interior 47. The other path is from the series of openings 51*a*, through the slot 100*a*, through the opening 55*a*, through the chamber 58*a*, through the slot 56*a*, and through the series of openings 57*a* into the hollow interior 47. This arrangement provides efficient communication of a negative air pressure to the series of openings 51**.

Each valve 53 is rotatably movable between a first and a second orientation or position about an axis parallel to the axis of the drum 15. At the left of FIG. 4, valve **53*a* is in its first or open position wherein communication is provided between the set of openings 51*a* and interior 47. At the right of FIG. 4, valve 53*b* is in its second or closed position wherein communication is blocked or prohibited between openings 51*b* and interior 47. Prohibition of vacuum communication is accomplished by rotating a valve 53 to its closed position so that its respective slot 55 is noncommunicative with the respective opening 100**.

Figure 5:
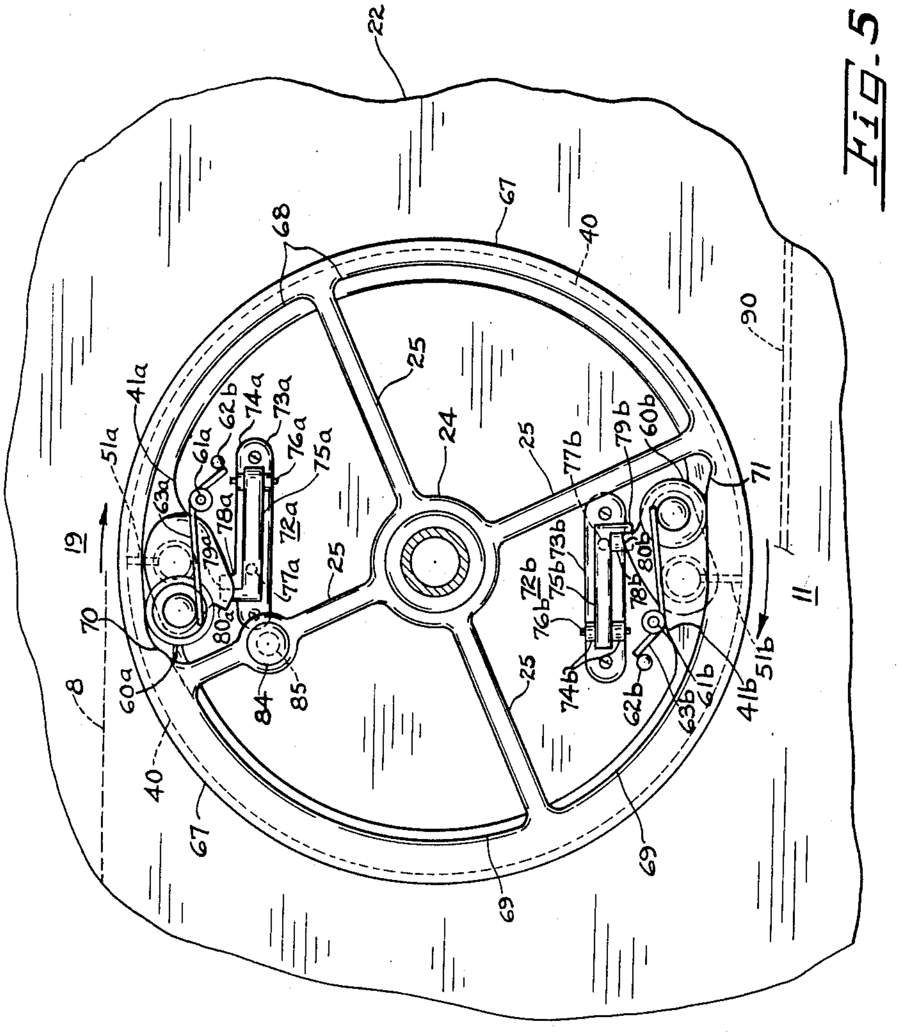
FIGURE 5 is a partial sectional view along line 5—5 of FIG. 4.

A means for actuating or rotatably moving each valve 53 is provided. Cam follower support or connecting shafts **59*a* and 59*b* are each attached to the bottom of respective actuating plates 54*a* and 54*b* at a point offset from the axis of the rotation of valve 53. Roller or wheel type cam followers 60*a* and 60*b* are rotatably attached to the other end of respective support shafts 59*a* and 59*b*. In FIG. 5, it may be seen that a cam follower 60 and shaft 59** are offset from the axis of the valve in a direction that is opposite to the indicated rotation of drum 15. Thus, a cam follower 60 and shaft 59 function as a lever to rotate the valve 53 about its axis.

As more fully explained below, each cam follower 60 is movable between a first and second orientation or position. When cam follower 60 is in its first position the respective valve 53 is in its open position, and when cam follower 60 is in its second position the respective valve 53 is in its closed position.

Means are provided for biasing each valve 53 and respective cam follower 60 toward their first positions (FIGS. 4 and 5). Support pins 61*a* and 61*b* (FIG. 5) and catch pins 62*a* and 62*b* protrude downward from the closure 42 of drum 15. Biasing springs 63*a* and 63*b* are each held by respective support pins 61*a* and 61*b* and urged against respective catch pins 62*a* and 62*b* and respective support shafts 59*a* and 59*b*. Spring 63 urges or biases the respective cam follower 60, support shaft 59, actuating plate 54, and valve 53 about the axis of the valve; the valve 53 is thus biased toward its open position and the cam follower 60 is biased toward its first position.

*Cam follower guide*

A means for guiding or regulating the movement of a cam follower 60 and consequently the position of the respective valve 53 at various points during the rotation of drum 15 is provided. As was previously described support arms 25 are connected to circular rim 67 which is in turn firmly attached to the document handler base 22. The inner surface of the circular rim 67 is a continuous cam. The cam is used to guide the cam followers 60*a* and 60*b* at various points in the drum's rotation.

The cam, FIGS. 4 and 5, comprises four distinct surfaces. Open or first position holding surface 68 is a portion of a cylindrical surface of constant radius, which radius is measured from the axis of the rotation of drum 15. In FIG. 5 cam follower 60*a* is shown in its first position and adjacent the surface 68. Closed or second position holding surface 69 is a portion of a cylindrical surface of constant radius, which radius is measured from the axis of rotation of drum 15 and is less than the radius associated with surface 68. In FIG. 5 cam follower 60*b* is shown in its second position and adjacent the surface 69.

Guide surface 70 is a surface whose radius from the axis of rotation of drum 15 gradually changes from the radius of surface 69 to that of surface 68.

Guide surface 71 is a surface whose radius from the axis of rotation of drum 15 gradually changes from the radius of surface 68 to that of surface 69.

Spring 63, in addition to biasing its respective valve 53 toward its open position, also biases its respective cam follower 60 toward the continuous cam surface. As shown in the FIGS. 4 and 5, cam follower 60 is biased against holding surface 68; the valve 53*a* is in its open position. Cam follower 60*b* is biased against holding surface 69; the valve 53*b* is in its closed position. In the absence of any restraining device or force, the cam followers 60 will follow surfaces 68, 69, 70, and 71 as the drum 15 rotates; valves 53*a* and 53*b* will oscillate between their open and closed positions.

*Cam follower and valve control*

In order to provide control over vacuum communication between interior 47 and the series of openings 51, a means is provided for maintaining each cam follower 60 and associated valve 53 in their closed and second position respectively so long as is required and to permit cam followers 60 to follow guide surfaces 70 and 71 at preselected times.

Guide surface 70 (FIG. 5) is positioned near the previously mentioned document directing region 19. Guide surface 71 is positioned near the previously mentioned document depositing compartment 11.

A cam follower control means or latch 72 (FIG. 5) is provided for each cam follower and valve to prevent or prohibit cam follower 60 from following the guide surfaces 70 and 71 and thereby to retain the respective valve 53 in its closed position. Latch support plates 73*a* and 73*b* (FIGS. 4 and 5) are rigidly attached to the underside of the bottom closure 42 and positioned between the respective actuating plates 54*a* and 54*b* and the axis of drum 15. Two apertured pivot pin support lugs 74 protrude downward from each support plate 73. A pivot arm 75 is pivoted about a pivot pin 76 inserted in the apertures of a pair of lugs 74. Spring 77 (FIGS. 4 and 5) disposed between pivot arm 75 and the support plate 73 biases the free end of arm 75 in the downward direction away from the bottom closure 42.

The free end of each pivot arm 75 has a radially outwardly protruding riding lug 78 (FIGS. 4 and 5). Forward of lug 78 and protruding downwardly is a latch lug 79. Each actuating plate 54 is formed with a protruding latch stop 80.

When one of the cam followers 60 is in its second position latch stop 80 is behind the latch lug 79 and directly below the riding lug 78. The force of spring 77 urges arm 75 downward and holds riding lug 78 against a riding surface 81 of latch stop 80. Biasing spring 63 biases the respective actuating plate 54 such that latch stop 80 is urged firmly against latch lug 79. The latch lug 79 thus restrains actuating plate 54 so that the corresponding valve 53 is held in its closed position, and the corresponding cam follower 60 is prohibited or disabled from following the surfaces of the cam.

When one of the valves 53 is to be moved to its open position it is only necessary to unlatch or release latch 72 so that the force of spring 63 will be effective to move the associated cam follower 60 against the surfaces of the cam.

When one of the actuating plates 53 has been moved so that the corresponding valve 53 and cam follower 60 are in their open or first position respectively the riding surface 81 of actuating plate 54 is directly below lug 79. The force of spring 77 then merely presses pivot arm 75 downward so that latch lug 79 is pressed against the riding surface 81.

As cam follower 60 follows guide surface 71 when the drum rotates, the cam follower 60 will be rotated to its second position and cause the associated actuating plate 54 to be similarly rotated. The riding surface 81 upon which the corresponding latch lug 79 is riding is rotated. The latch lug 79 then drops in front of the latch stop 80 and is held in that position by the force of spring 77. The latch is thus in a latched state. Subsequently the rotating drum 15 pulls the cam follower 60 along surface 69. Thus both the latch 72 and surface 69 serve to keep the valve 53 and cam follower 60 in their closed and second positions respectively.

As the rotating drum 15 pulls the cam follower 60 along surface 69 toward surface 70 the cam follower 60 is prevented or disabled from following surface 70 since the associated actuating plate 54 is restrained by the engagement of lug 79 with stop 80.

There has thus been described thus far a device for automatically moving a valve 53 to its closed position and for locking the valve 53 in its closed position by prohibiting the associated cam follower 60 from following the surfaces of the cam.

There will now be described apparatus for unlatching the valve 53 by enabling the associated cam follower 60 to follow the surfaces of the cam. The enabling of the cam follower 60 is accomplished at a particular angular point in the rotation of the drum 15. Unlatching of the valve 53 will result in the valve being rotated to its open position thereby allowing communication of a vacuum with the associated set of openings 51.

As shown in FIGS. 4 and 5, a solenoid 84 is attached to one of the support arms 25 and positioned approximately on an imaginary line running from surface 70 to the center of the drive shaft housing 24. In addition, the solenoid 84 is positioned directly below the path of travel of the latches 72_a_ and 72_b_ as they are carried along by the rotating drum 15. A snubber tipped armature 85 of the solenoid 84 is normally in the retracted position (as shown in FIG. 4).

The solenoid 84 is energized by an electrical decision signal stored in the temporary memory 10 as the associated pivot arm 75 of the latch 72 just begins to pass over the armature 85. Energization of the solenoid 84 causes the armature 85 to be forced upward and against the bottom of the pivot arm 75. The pivot arm 75 is pivoted upward by the force of the armature 85 and thereby lifts latch lug 79 from in front of the latch stop 80 of the actuating plate 54.

The solenoid 84 is held energized by electrical power originating from the temporary memory 10, for only as long as the pivot arm 75 passes over it.

At the instant the armature 85 lifts the pivot arm 75, the associated cam follower 60 is being pulled from surface 69 onto surface 70. Since the actuating plate 54 is now free to rotate the cam follower 60 is enabled to follow surface 70 as the drum 15 continues to rotate.

The cam follower 60 follows surface 70 and then follows surface 68. The corresponding valve 53 is accordingly rotated to its open position.

When the pivot arm 75 has passed beyond armature 85 the force of spring 77 urges the pivot arm 75 downward. However, since the riding surface 81 is now directly underneath the latch lug 79 the lug 79 merely rides on surface 81. Action as described previously will subsequently take place automatically to cause the valve 53 to be rotated to its closed position and cause the associated cam follower 60 to be once again latched in its second position.

OPERATION

The structural details of one embodiment of the present invention have been described. Operation of the invention in removing or directing a document from a transporting path and transferring it to a document stacking compartment 11 will now be more fully explained. As was previously explained document feeding device 7 (FIG. 1) feeds documents at regular time intervals. The timing of document feeding is such that the leading edge 17 of a document 8 (FIGS. 3 and 5) that is being transported by the moving belts 12 and 13 arrives at each document directing region 19 of the document transferring section 3 only during certain particular predetermined phases of the rotation of drum 15.

These predetermined phases correspond to the times that a set of openings 51 are adjacent the region 19. These phases also correspond to the times when one of pivot arms 75 is just beginning to pass over the armature 85 of solenoid 84.

In the embodiment described heretofore, two valves 53_a_ and 53_b_ and associated latches 72_a_ and 72_b_ are utilized. Therefore, feeding device 7 may feed documents during each half cycle of drum rotation. Two of the above mentioned predetermined phases occur during each revolution of drum 15. Therefore it is possible to transfer into the same stacking compartment 11 two documents fed in succession in the time drum 15 makes one complete revolution.

When the leading edge 17 of a document 8 begins to enter the chosen directing region 19, the electrical decision signal stored in temporary memory 10 is transmitted to the solenoid 84 associated with the chosen document transferring section 3. An associated valve 53 will thus be rotated to its open position allowing vacuum to be communicated to the associated set of openings 51 thereby urging the leading edge 17 of the document 8 to adhere firmly to the surface of the drum 15.

The leading edge 17 of the document is thus directed out of the path of travel defined by belt 12 and the set of openings 51. Since belt 13 is wrapped around the drum 15 in the vicinity of region 19 there is nothing to interfere with the document following openings 51. In fact the continued slight friction between belt 13 and document 8 aids efficient movement of the document 8 with the surface of the rotating drum 15.

As the drum 15 continues to rotate, carrying with it the document 8, the leading edge 17 begins to approach the document stacking compartment 11. The drum 15 at this time has rotated approximately 180° since vacuum was first communicated to the set of openings 51. In addition, at this time the cam follower 60, which has been following holding surface 68, meets and begins to follow surface 71 thereby initiating action to close the valve 53 as previously described.

As the document 8 adhering to the drum 15 begins to enter the stacking compartment 11 (FIGS. 2, 3, and 4) its leading edge 17 begins to pass over the tips of a set of pickoff fingers 86 that protrude into a set of circumferential grooves 87 provided in the exterior of wall 40 of drum 15. Fingers 86 extend into the grooves 87 from a support member 88 attached to base 22.

The function of the fingers 86 is to strip or pickoff the document 8 from the drum's surface when vacuum is cut off from the set of openings 51, and to direct the leading edge 17 of the document 8 against a rigid alignment plate 89 and a movable backup plate 90.

The backup plate 90 is movably supported (support not shown) in an upright position and gently biased toward the drum 15 and pickoff fingers 86. As succeeding documents are deposited in the stacking compartment 11, plate 90 is forced rearward away from the drum 15. The biasing force on the plate 90 is only of such magnitude that the documents are gently held upright between the plate 90 and drum 15. Friction between the drum 15, belt 13 and the last document deposited, is of a magnitude to allow easy slippage so that the last document in the stack is not damaged.

A document protector plate 65 is mounted on the base 22 between each drum 15 and the succeeding document transferring section 3 to protect the lagging edge of the transferred document 8 from making contact with the moving belt 13 associated with such succeeding transferring section 3.

SECOND EMBODIMENT

Another embodiment of the present invention is illustrated in FIGS. 6, 7, 8, and 9. The basic structure of the drum 15 is identical with the drum shown and described in the previous figures. Valve assembly housings 92_a_ and 92_b_ are continuous extensions of cylindrically surfaced wall 40. Valves 91_a_ and 91_b_, structurally similar to the valves 53 in FIG. 4 are contained in each housing 92_a_ and 92_b_. A valve 91 may or may not be tubular shaped. However, there is a common distributing chamber 58, plus a series of sets of openings 55 and 56 as mentioned in the descriptions of the previous embodiment.

Each valve 91 and housing 92 is constructed such that the valve is movable up and down in the housing between open position, which is the down position, and a closed position, which is the up position. As shown at the left in FIG. 6 each opening communicates directly with a corresponding opening 51 of wall 40 when the valve is in the open position. Additionally, openings 56 provided in the valve 91 communicate directly with corresponding openings 57 provided in the valve assembly housing 92. As shown in the right in FIG. 6, when the valve 91_b_ is in the closed position openings 55 are noncommunicative with corresponding openings 51_b_.

Roller type cam followers 97_a_ and 97_b_ are suitably linked to the lower end of respective valves 91_a_ and 91_b_ by means of respective connecting shafts 98_a_ and 98_b_.

Each cam follower 97 is movable between an up position and a down position along with the associated valve 91.

Figure 8:
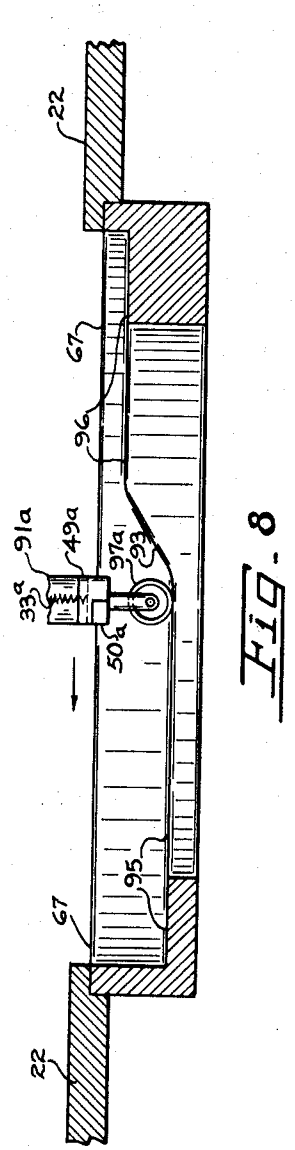
FIGURE 8 is a partial sectional view along the lines 8—8 of FIGS. 6 and 7.
Figure 9:
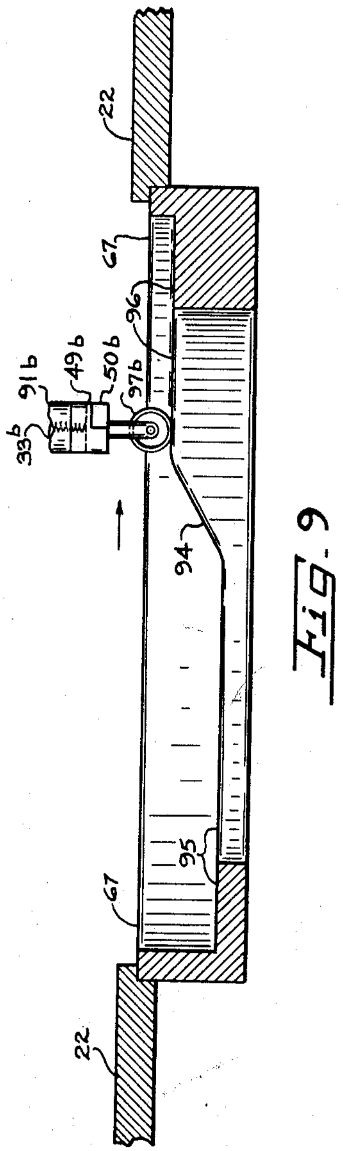
FIGURE 9 is a partial sectional view along the lines 9—9 of FIGS. 6 and 7.

Attached to and continuous with the circular rim 67 is a continuous cam indicated as an inwardly protruding flange providing four distinct cam surfaces (shown in FIGS. 8 and 9).

Surface 95 is a plane surface whose plane is at right angles to the axis of drum 15 and is positioned a fixed distance below the drum 15. Surface 96 is a plane surface whose plane is at right angles to the axis of drum 15 and is at a fixed distance closer to the drum 15 than the distance separating drum 15 from surface 95.

Surface 93 is a sloping surface contained between and connecting with surfaces 96 and 95. Surface 94 is a sloping surface contained between and connecting with surfaces 95 and 96.

Actuating plates 99*a* and 99*b* attached to the lower end of respective valves 91*a* and 91*b* protrude radially inward toward the axis of the drum 15. Springs 82*a* and 82*b*, positioned between respective plates 99*a* and 99*b* and the bottom closure 42 of the drum 15, urge the plates 99 and valves 97 downward toward the open position. Cam followers 97 are thus also urged downward toward the surfaces. Riding lugs 49*a* and 49*b* protrude upward from the end of respective actuating plates 99*a* and 99*b*. The lower surface of the end of each actuating plate 99*a* and 99*b* is provided with respective indentation 50*a* and 50*b*.

Figure 7:
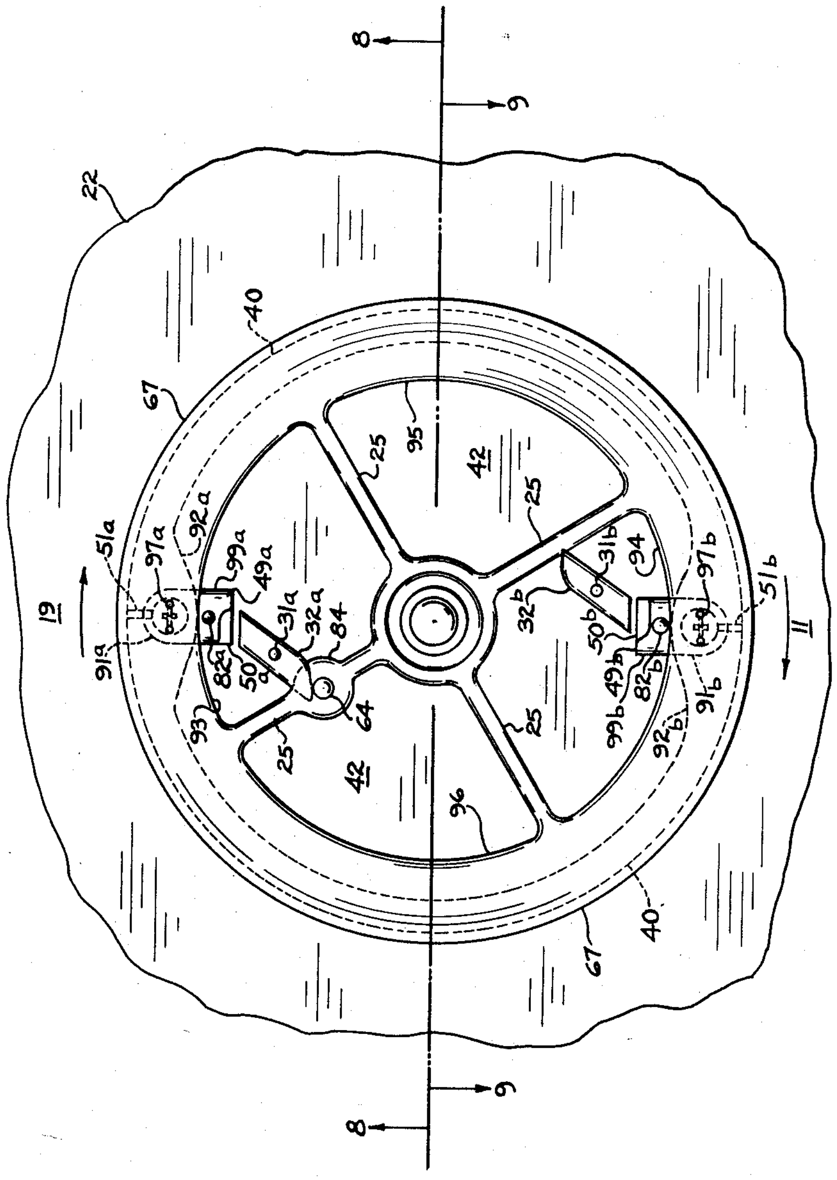
FIGURE 7 is a partial sectional view along line 7—7 of FIG. 6.

Support shafts 31*a* and 31*b* are attached to and protrude downward from the bottom closure 42. Latch arms 32*a* and 32*b* are pivotally attached at their centers to the lower end of respective support shafts 31*a* and 31*b*. Biasing springs 33*a* and 33*b* are contained on respective support shafts 31*a* and 31*b* and connected between the bottom closure 42 and respective latch arms 32*a* and 32*b* so that they bias the latch arms 32*a* and 32*b* in the counterclockwise direction as illustrated in FIG. 7.

When a valve such as 91*a* is in its open position (shown at the left in FIG. 6 and at the top in FIG. 7), the outer end of latch arm 32*a* is held against riding lug 49*a* by the force of spring 33*a*

When the actuating plates 99*a* and 99*b* and corresponding valves 91*a* and 91*b* are moved upward by the respective cam followers 97*a* and 97*b* as they meet and follow surface 94, the riding lugs 49 slide against the outer end of respective latch arms 32 until the latch arm engages its respective stop 50. The latch arm 32 is retained in position by the force of associated spring 33. The associated cam follower 97 is thus disabled from following the cam and the associated valve 91 is latched in its closed position.

The means for enabling the cam followers 97*a* and 97*b* to follow the surfaces 93, 94, 95, and 96 is provided by a solenoid 84 and the inner arms of latch arms 32*a* and 32*b*.

The solenoid 84 is very similar to that provided with the first described embodiment. In this second embodiment energization of the solenoid 84 by the Decision Signal from the temporary memory 10 causes an armature 64 to be forced upward. As the drum 15 rotates the inner arm of a latch arm 32 contacts the upward standing armature 64 (FIG. 6). The armature 64 is thus an obstruction to the inner end of latch arm 32 when the solenoid 84 is energized. The latch arm 32 is then pivoted in the clockwise direction (FIG. 7) thereby removing its outer arm from the associated stop 50. The associated cam follower 97 is thus enabled to follow the surface 93 to cause the associated valve 91 to be moved to its open position and vacuum is then communicated to the associated set of openings 51. Subsequently cam follower 97 meets and follows surface 94 and is moved upward to cause the valve 91 to be placed in its closed position thereby blocking communication of a vacuum with the associated openings 51.

The described and illustrated second embodiment of the present invention operates in a manner very similar to that described for the first embodiment to direct a document from a transporting path and deposit the document in a stacking compartment 11.

In addition to being employed for a stacking operation, the present invention may be used as a document feeding device wherein a stationary document is picked up and transferred to a document transporting system. This may be accomplished by positioning a stationary stack of documents adjacent the directing region 19 (in the absence of moving belt 12) and positioning a document transporting system adjacent the drum 15 in the vicinity of the pickoff fingers 86 (in the absence of the stacking compartment 11). The solenoid 84 may be energized by means of a manually operated switch or by an externally originated signal such as from an electronic data processor.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. For use with a document transferring device the combination comprising: a drum including an exterior cylindrical surface and a sidewall which is thin in comparison with the outside diameter of the drum such that said drum has a substantially hollow interior comprising the major portion of the total volume of said drum, said drum being mounted for rotation about an axis, and said cylindrical surface being provided with at least one opening; means for maintaining said hollow interior evacuated; a valve mounted within said drum and disposed between said one opening and said hollow interior, said valve being movable with respect to said drum between a first orientation and a second orientation, said first orientation providing communication between said one opening and said hollow interior, and said second orientation prohibiting communication between said one opening and said hollow interior.

2. For use with a document transferring device the combination comprising: a drum mounted for rotation about an axis, said drum including a cylindrically surfaced wall, of relatively small thickness, and end closures defining a substantially hollow interior comprising the major portion of the total volume of said drum, said wall being provided with at least one opening; means for maintaining said hollow interior at a pressure lower than atmospheric; a valve assembly mounted within said drum and disposed adjacent said one opening, and further disposed between said cylindrically surfaced wall and said hollow interior, said valve assembly including a valve movable with respect to said drum between a first orientation and a second orientation, said first orientation allowing communication between said one opening and said hollow interior.

3. For use with a document transferring device the combination comprising: a drum mounted for rotation about an axis, said drum including an exterior cylindrically surfaced wall, of relatively small thickness, and end closures defining an interior volume, said interior volume constituting the major portion of the total volume defined by said drum, said cylindrically surfaced wall being provided with a set of openings; means for maintaining said volume at a pressure less than atmospheric; a valve assembly mounted within said volume and disposed adjacent said set of openings; said valve assembly including a valve movable with respect to said drum between a first orientation and a second orientation, said first orientation communicating said volume with said set of openings, and said second orientation prohibiting communication between said volume and said set of openings.

4. For use with a document transferring device the combination comprising: a drum mounted for rotation about an axis, said drum including an exterior cylindrically surfaced wall having a thickness which is small in comparison with the diameter of said drum, and end closures to thereby define a substantially hollow interior comprising the major portion of the total volume defined by said drum, said cylindrically surfaced wall being provided with a plurality of first openings arranged in a column; means for maintaining said hollow interior at a pressure less than atmospheric; a valve assembly rotatable with said drum and disposed between said hollow interior and said first openings; said valve assembly including a valve housing, said valve housing being a continuous extension of said cylindrically surfaced wall; said first openings communicating with said valve housing; said valve housing being provided with a plurality of second openings providing communication between said hollow interior and said valve housing; a valve contained within said valve housing and disposed adjacent said first and second openings, said valve being movable with respect to said drum between a first position and a second position, said first position communicating said first openings with said second openings and said second position prohibiting communication between said first openings and said second openings.

5. For use with a document transferring device the combination comprising: a drum mounted for rotation about an axis, said drum including a relatively thin, cylindrically surfaced wall and end closures defining a substantially hollow interior comprising the major portion of the total volume defined by said drum, said wall being provided with at least one first opening; means for maintaining said hollow interior at a pressure lower than atmospheric; a valve housing contained within said hollow interior and disposed adjacent said first opening, said valve housing rotatable with said drum; said one first opening communicating with said valve housing; said valve housing being provided with at least one second opening, said second opening communicating with said hollow interior; a valve contained within said valve housing, said valve being movable between a first orientation and a second orientation, said first orientation allowing communication between said first opening and said second opening and said second orientation prohibiting communication between said first opening and said second opening.

6. For use with a document transferring device the combination comprising: a drum mounted for rotation about an axis, said drum including an exterior cylindrically surfaced wall having a thickness which is small in comparison with the diameter of said drum, and end closures to thereby define a substantially hollow interior, said wall being provided with a first plurality of openings arranged in a column substantially parallel to said axis; means for maintaining said hollow interior at a pressure less than atmospheric; a valve assembly carried with said drum and disposed between said hollow interior and said first plurality of openings; said valve assembly including a valve housing, said first plurality of openings communicating with said valve housing; said valve housing being provided with a second plurality of openings communicating between said valve housing and said hollow interior; a valve contained within said valve housing and disposed adjacent said first and said second plurality of openings, said valve being movable between a first position and a second position, said valve provided with a third opening. a fourth opening, and a common means communicating said third and said fourth openings with each other; said third opening being arranged to communicate directly with said first plurality of openings when said valve is in said first position and further arranged for noncommunication with said first plurality of openings when said valve is in said second position, said fourth opening being arranged to communicate with said second plurality of openings when said valve is in said first and said second positions.

7. The combination of claim 6 wherein said valve housing is a continuous extension of said cylindrically surfaced wall.

8. The combination of claim 6 wherein said valve is rotatable with respect to said drum about a second axis.

9. The combination of claim 6 wherein said valve is movable in a straight line motion.

10. The combination of claim 6 wherein said valve is a tubular shaped valve and said common means is a hollow interior provided in said tubular valve.

11. For use with a document transferring device the combination comprising: a drum mounted for rotation about an axis, said drum including a cylindrically surfaced wall and end closures defining a substantially hollow interior, said wall being provided with a first set of openings, means for maintaining said hollow interior at a pressure lower than atmospheric; a valve housing contained within said hollow interior and disposed adjacent said first set of openings, said valve housing being rotatable with said drum, said first set of openings communicating with said valve housing; said valve housing being provided with a second set of openings, said second set of openings communicating with said hollow interior; a valve contained within said valve housing, said valve being movable between a first position and a second position, said valve being provided with a third set of openings, a first opening and a common distributing chamber communicating said third set of openings and said first opening with each other, said third set of openings and said first opening arranged and positioned such that when said valve is in said first position said third set of openings is adjacent to and communicates with said first set of openings, and said first opening is adjacent to and communicates with said second set of openings, said third set of openings and said first opening further arranged and positioned such that when said valve is in said second position said third set of openings is noncommunicative with said first set of openings and said first opening is communicative with said second set of openings.

12. The combination of claim 1 further including: means for moving said valve to said first orientation and to said second orientation at points in the rotation of said drum.

13. The combination of claim 1 further including: a first means for moving said valve to said first orientation at a first point in the rotation of said drum; and a second means for moving said valve to said second orientation at a second point in the rotation of said drum.

14. In a document transferring apparatus including a drum mounted for rotation about an axis, and a valve carried with said drum about said axis, said valve being movable between a first orientation and a second orientation with respect to said drum, a means for moving said valve comprising: a cam follower operatively connected to said valve to actuate said valve, said cam follower being carried in a path of travel about said axis; a stationary cam positioned adjacent said path of travel, said stationary cam being provided with a first surface and a second surface; means for urging said cam follower to follow said stationary cam; cam follower control means having an enabling state wherein said cam follower follows said stationary cam, and having a disabling state wherein said cam follower is prevented from following said stationary cam; said first surface arranged to guide said cam follower such that said valve is moved from said second orientation to said first orientation; said second surface arranged to guide and move said cam follower such that said valve is moved from said first orientation to said second orientation; enabling means for placing said cam follower control means in said enabling state at a first predetermined position in the rotation of said drum, disabling means for placing said cam follower control means in said disabling state at a second predetermined position in the rotation of said drum.

15. The combination of claim 14 wherein said cam follower includes a roller arranged to make rolling contact with said stationary cam when said cam follower control means is in its enabling state.

16. The combination of claim 14 wherein said first surface and said second surface are surfaces which slope in a direction longitudinal to said axis.

17. The combination of claim 14 wherein said first surface and said second surface are surfaces which slope in a direction transverse to said axis.

18. The combination of claim 14 wherein said enabling means includes an electrically energizable solenoid.

19. The combination of claim 18 wherein said cam follower control means includes a pivoted member carried with said drum and further including an extension of said valve arranged to cooperate with said pivoted member.

20. The combination of claim 19 wherein said electrically energized solenoid includes an armature, said armature making sliding contact with said pivoted member when said solenoid is energized.

21. In a document transferring apparatus including a drum mounted for rotation about an axis and a valve carried with said drum about said axis, said valve being movable between a first orientation and a second orientation with respect to said drum, a means for moving said valve comprising: a movable cam follower for actuating said valve, said cam follower being carried in a path of travel about said axis and linked to said valve; a continuous stationary cam disposed adjacent said path of travel, said stationary cam being provided with a first cam surface and a second cam surface; said cam follower adapted to follow said stationary cam; latch means having a withholding state wherein said cam follower is withheld from said stationary cam as said drum is rotated, and having an allowance state wherein said cam follower follows said stationary cam as said drum is rotated; said first cam surface arranged to guide said cam follower such that said valve is moved from said second orientation to said first orientation, said second cam surface arranged to guide and move said cam follower such that said valve is moved from said first orientation to said second orientation, said cam follower further operatively linked with said latch means such that said latch means is placed in said withholding state as said cam follower follows said second cam surface; means responsive to an electrical signal for placing said latch means in said allowance state at a point in the rotation of said drum wherein said cam follower begins to follow said first cam surface.

22. An apparatus for transferring documents from an initial position to a terminal position comprising: a drum mounted for rotation about an axis, said drum including an exterior cylindrically surfaced wall and end closures defining a hollow interior, said wall being provided with a column of openings; means for maintaining said hollow interior at a pressure less than atmospheric; a valve carried with said drum and disposed between said column of openings and said hollow interior, said valve being movable between a first orientation and a second orientation, said first orientation allowing communication between said hollow interior and said column of openings, and said second orientation prohibiting communication between said hollow interior and said column of openings; a cam follower operatively linked to said valve, said cam follower being carried in a path of travel about said axis, said cam follower being movable between a first position and a second position wherein said valve is moved to its first orientation when said cam follower is moved to its first position, and a second position wherein said valve is moved to its second orientation when said cam follower is moved to its second position; a stationary cam positioned adjacent said path of travel of said cam follower, said stationary cam being provided with a first cam surface and a second cam surface; biasing means for urging said cam follower to follow said stationary cam; cam follower control means carried with said drum, said cam follower control means having an enabling state wherein said cam follower follows said stationary cam, and said cam follower control means having a disabling state wherein said cam follower is prohibited from following said stationary cam; said first cam surface arranged to guide said cam follower to its first position, said second cam surface arranged to guide and move said cam follower to its second position; disabling means for placing said cam follower control means in said disabling state at a first predetermined point in the rotation of said drum; enabling means responsive to an electrical signal for placing said cam follower control means in said enabling state at a second predetermined point in the rotation of said drum.

23. The combination of claim 22 wherein said first predetermined point is adjacent said second cam surface, and said second predetermined point is adjacent said first cam surface.

24. The combination of claim 22 wherein said first predetermined point is adjacent said initial position, and said second predetermined point is adjacent said terminal position.

25. The combination of claim 22 wherein said cam follower control means includes a pivoted member carried with said drum and further including a latch member rigidly attached to said cam follower and arranged to cooperate with said pivoted member, and wherein said enabling means includes a stationary solenoid provided with a movable armature, said armature arranged to make contact with said pivoted member in response to said electrical signal.

26. An apparatus for transferring documents from an initial position to a terminal position comprising: a drum mounted for rotation about an axis, said drum including an exterior cylindrically surfaced wall and end closures defining a hollow interior, said wall being provided with a first set of openings; means for maintaining said hollow interior at a pressure less than atmospheric; a valve housing carried by said drum and disposed between said first set of openings and said hollow interior, said first set of openings communicating with said valve housing, said valve housing being provided with a first opening communicating with said hollow interior; a cam follower and a valve each being movable between a first position and a second position; said valve being contained within said valve housing, said first position of said valve providing communication between said first set of openings and said first opening, said second position of said valve prohibiting communication between said first set of openings and said first opening; linking means connecting said cam follower with said valve for moving said valve to its first position when said cam follower is moved to its first position and for moving said valve to its second position when said cam follower is moved to its second position, said linking means further carrying said cam follower in a path of travel about said axis, a stationary cam provided with a first cam surface and a second cam surface, said stationary cam positioned adjacent said path of travel of said cam follower; biasing means for urging said cam follower to follow said stationary cam, said biasing means further providing a force for moving said cam follower from said second position to said first position; latch means carried with said drum, said latch means having an unlatched state wherein said cam follower follows said stationary cam, and said latch means having a latched state wherein said cam follower is prevented from following said stationary cam; said first cam surface arranged to guide said cam follower to its first position, said second cam surface arranged to guide and move said cam follower to its second position; latching means for placing said latch in said latched state at a first predetermined point in the rotation of said drum; unlatching means responsive to an electrical signal for placing said latch in said unlatched state at a second predetermined point in the rotation of said drum.

27. The combination of claim 26 wherein said valve is rotatable about an axis.

28. The combination of claim 26 wherein said valve is movable in a straight line motion between said first position and said second position.

29. The combination of claim 26 wherein said cam follower is rotatable about a second axis.

30. The combination of claim 26 wherein said cam follower is movable in a straight line motion parallel to said axis.

31. The combination of claim 26 wherein said cam follower includes a roller urgable against said stationary cam.

32. The combination of claim 26 wherein said stationary cam comprises rigid surfaces parallel to said axis.

33. The combination of claim 26 wherein said stationary cam comprises rigid surfaces transverse to said axis.

34. The combination of claim 26 wherein said enabling means includes a solenoid furnished with an armature.

35. The combination of claim 26 wherein said first cam surface and second cam surface are rigid surfaces sloped in a direction radial to said axis.

36. The combination of claim 26 wherein said first cam surface and second cam surface are rigid surfaces sloped in a direction longitudinal to said axis.

37. An apparatus responsive to an electrical signal for transferring documents comprising: a drum mounted for rotation about an axis, said drum including an exterior cylindrically surfaced wall and end closures defining a hollow interior, said wall being provided with a first set of openings; means for maintaining said hollow interior at a pressure less than atmospheric; a valve housing, said valve housing being a continuous extension of said cylindrically surfaced wall and disposed between said first set of openings and said hollow interior, said first set of openings communicating directly with said valve housing, said valve housing being provided with a second set of openings communicating with said hollow interior; a cam follower and a valve each being movable between a first position and a second position; said valve contained within said valve housing; said valve being provided with a third set of openings, a first opening, and a common means communicating said third set of openings and said first opening with each other, said third set of openings arranged to communicate directly with said first set of openings when said valve is in said first position, and said third set of openings arranged to be noncommunicative with said first set of openings when said valve is in said second position; said first opening arranged to communicate directly with said second set of openings when said valve is in said first position, linking means connecting said cam follower with said valve for moving said valve to its first position when said cam follower is moved to its first position and for moving said valve to its second position when said cam follower is moved to its second position, said linking means further carrying said cam follower in a path of travel about said axis, a stationary cam being provided with a first cam surface and a second cam surface, said stationary cam positioned adjacent said path of travel of said cam follower; biasing means for urging said cam follower to follow said stationary cam, said biasing means further providing a force for moving said cam follower from said second position to said first position; latch means carried with said drum, said latch means having an unlatched state wherein said cam follower follows said stationary cam, and said latch means having a latched state wherein said cam follower is prevented from following said stationary cam; said first cam surface arranged to guide said cam follower to its first position, said second cam surface arranged to guide and move said cam follower to its second position; latching means for placing said latch means in said latched state at a first predetermined point in the rotation of said drum; unlatching means responsive to an electrical signal for placing said latch means in said unlatched state at a second predetermined point in the rotation of said drum.

38. The combination according to claim 37 wherein said first opening is further arranged to communicate directly with said second set of openings when said valve is in said second position.

References Cited by the Examiner

UNITED STATES PATENTS

| | | | |
|---|---|---|---|
| 2,730,360 | 1/56 | Heywood | 271—27 |
| 2,759,543 | 8/56 | Conti | 271—71 X |
| 2,867,438 | 1/59 | Tatsu Hori | 271—74 |

ROBERT B. REEVES, *Acting Primary Examiner.*

RAPHAEL M. LUPO, SAMUEL F. COLEMAN, *Examiners.*